US011461950B2

(12) United States Patent
Cao et al.

(10) Patent No.: US 11,461,950 B2
(45) Date of Patent: Oct. 4, 2022

(54) OBJECT CREATION USING BODY GESTURES

(71) Applicant: Microsoft Technology Licensing, LLC, Redmond, CA (US)

(72) Inventors: Xiang Cao, Beijing (CN); Yang Liu, Beijing (CN); Teng Han, Pittsburg, PA (US); Takaaki Shiratori, Tokyo (JP); Nobuyuki Umetani, Toronto (CA); Yupeng Zhang, Beijing (CN); Xin Tong, Beijing (BE); Zhimin Ren, Durham, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/145,517

(22) Filed: Jan. 11, 2021

(65) Prior Publication Data

US 2021/0134043 A1    May 6, 2021

Related U.S. Application Data

(63) Continuation of application No. 16/744,715, filed on Jan. 16, 2020, now Pat. No. 10,916,047, which is a
(Continued)

(51) Int. Cl.
*G06T 19/20* (2011.01)
*G06T 13/40* (2011.01)
*G06F 3/01* (2006.01)
*G06F 3/042* (2006.01)
*G06F 3/03* (2006.01)
*G06F 3/048* (2013.01)

(52) U.S. Cl.
CPC .............. *G06T 13/40* (2013.01); *G06F 3/017* (2013.01); *G06F 3/0304* (2013.01); *G06F 3/048* (2013.01); *G06F 3/0425* (2013.01); *G06T 19/20* (2013.01); *G06T 2219/20* (2013.01)

(58) Field of Classification Search
None
See application file for complete search history.

(56) References Cited

U.S. PATENT DOCUMENTS

2008/0122786 A1* 5/2008 Pryor ...................... G06F 3/038
345/156
2009/0228841 A1* 9/2009 Hildreth ................ G06F 3/0304
715/863
(Continued)

*Primary Examiner* — Vu Nguyen
(74) *Attorney, Agent, or Firm* — Faegre Drinker Biddle & Reath LLP

(57) ABSTRACT

An intuitive interface may allow users of a computing device (e.g., children, etc.) to create imaginary three dimensional (3D) objects of any shape using body gestures performed by the users as a primary or only input. A user may make motions while in front of an imaging device that senses movement of the user. The interface may allow first-person and/or third person interaction during creation of objects, which may map a body of a user to a body of an object presented by a display. In an example process, the user may start by scanning an arbitrary body gesture into an initial shape of an object. Next, the user may perform various gestures using his body, which may result in various edits to the object. After the object is completed, the object may be animated, possibly based on movements of the user.

20 Claims, 7 Drawing Sheets

Related U.S. Application Data continuation of application No. 15/888,572, filed on Feb. 5, 2018, now Pat. No. 10,573,049, which is a continuation of application No. 14/770,800, filed as application No. PCT/CN2013/072067 on Mar. 1, 2013, now Pat. No. 9,928,634.

(56) References Cited

U.S. PATENT DOCUMENTS

| | | | |
|---|---|---|---|
| 2010/0302138 A1* | 12/2010 | Poot | G06F 3/011 345/156 |
| 2010/0303289 A1* | 12/2010 | Polzin | A63F 13/428 382/103 |
| 2011/0193939 A1* | 8/2011 | Vassigh | G06F 3/017 348/46 |
| 2011/0262002 A1* | 10/2011 | Lee | G06F 3/011 382/103 |
| 2013/0124149 A1* | 5/2013 | Carr | G06T 19/20 703/1 |

* cited by examiner

OBJECT CREATION USING BODY GESTURES

CROSS-REFERENCE TO RELATED PATENT APPLICATIONS

This application is a Continuation Application of U.S. patent application Ser. No. 16/744,715, file Jan. 16, 2020, which is a Continuation Application of U.S. patent application Ser. No. 15/888,572, filed Feb. 5, 2018, now U.S. Pat. No. 10,573,049 issued Feb. 25, 2020, which is a Continuation Application of U.S. patent application Ser. No. 14/770,800, filed Aug. 26, 2015, now U.S. Pat. No. 9,928,634 issued Mar. 27, 2018, which is a 371 National Phase of Patent Cooperation Treaty Application No. PCT/CN2013/072067, filed Mar. 1, 2013, each of which is herein incorporated by reference in its entirety.

BACKGROUND

Many video games feature avatars that are controllable by one or more players of the games. Some games allow a player to select an avatar that the player then controls during the game. Typically, avatars are selected from existing avatars that may or may not be customized. Customization often includes changing colors, basic attributes, or other features by selecting from various choices provided by the game. Thus, the creation or modification of avatars is often limited to a finite amount of possibilities that are dictated by the designer of the game.

Three dimensional (3D) modeling is traditionally accomplished using sophisticated and expensive 3D computer graphics software that requires some formal training to operate and is not intuitive to the general population. Creating even simple objects, such as a simple avatar, using graphics software can be time consuming and require many steps.

More recently, imaging software allows users to convert two dimensional (2D) images into 3D model. This may allow a user to select an object from the real world, obtain 2D images of the object, and then convert the images into a virtual 3D object. However, modification of the virtual 3D object still presents challenges and may be time consuming and require many steps.

SUMMARY

An intuitive interface may allow users of a computing device (e.g., children, etc.) to create imaginary three dimensional (3D) objects of any shape using body gestures performed by the users as a primary or only input. A user may make gestures (motions) while in front of an imaging device that senses movement of the user.

The interface may employ a mapping perspective that is maintained between the user and the 3D object. The mapping may be a body reference mapping where the user is mapped to a similar location as the 3D object to allow the user to interact with the 3D object in a first-person editing perspective (as if the user were inside of the 3D object or were the 3D object). The mapping may be a spatial mapping where the user is mapped to a location outside of the 3D object to allow the user to interact with the 3D object in a third-person editing perspective (allowing the user to walk around the 3D object, etc.).

In some embodiments, the user may start by scanning an arbitrary body gesture into an initial shape of a 3D object. Next, the user may perform various gestures using his body, which may result in various edits to the 3D object. An edit may include selection of a surface or part of a surface of the 3D object based on a first part of the body gesture performed by the user and modifying the surface of the 3D object based on a second part of the body gesture of the user. After the 3D object is completed, the 3D object may be animated, possibly based on movements of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

An intuitive interface may allow users of a computing device (e.g., children or other users) to create imaginary three dimensional (3D) objects and avatars of any shape using body gestures performed by the users as a primary or only input. A user may make motions while in front of an imaging device that senses movement of the user. The interface may allow first-person and/or third person interaction during creation of objects or avatars, which may map a body of a user to a body of an object or avatar presented by a display. In an example process, the user may start by scanning an arbitrary body gesture into an initial shape of an object or avatar. Next, the user may perform various gestures using his or her body, which may result in various edits to the object or avatar. After the object or avatar is completed, the object or avatar may be animated, possibly based on movements of the user.

The processes and systems described herein may be implemented in a number of ways. Example implementations are provided below with reference to the following figures.

Illustrative Environment

Figure 1:
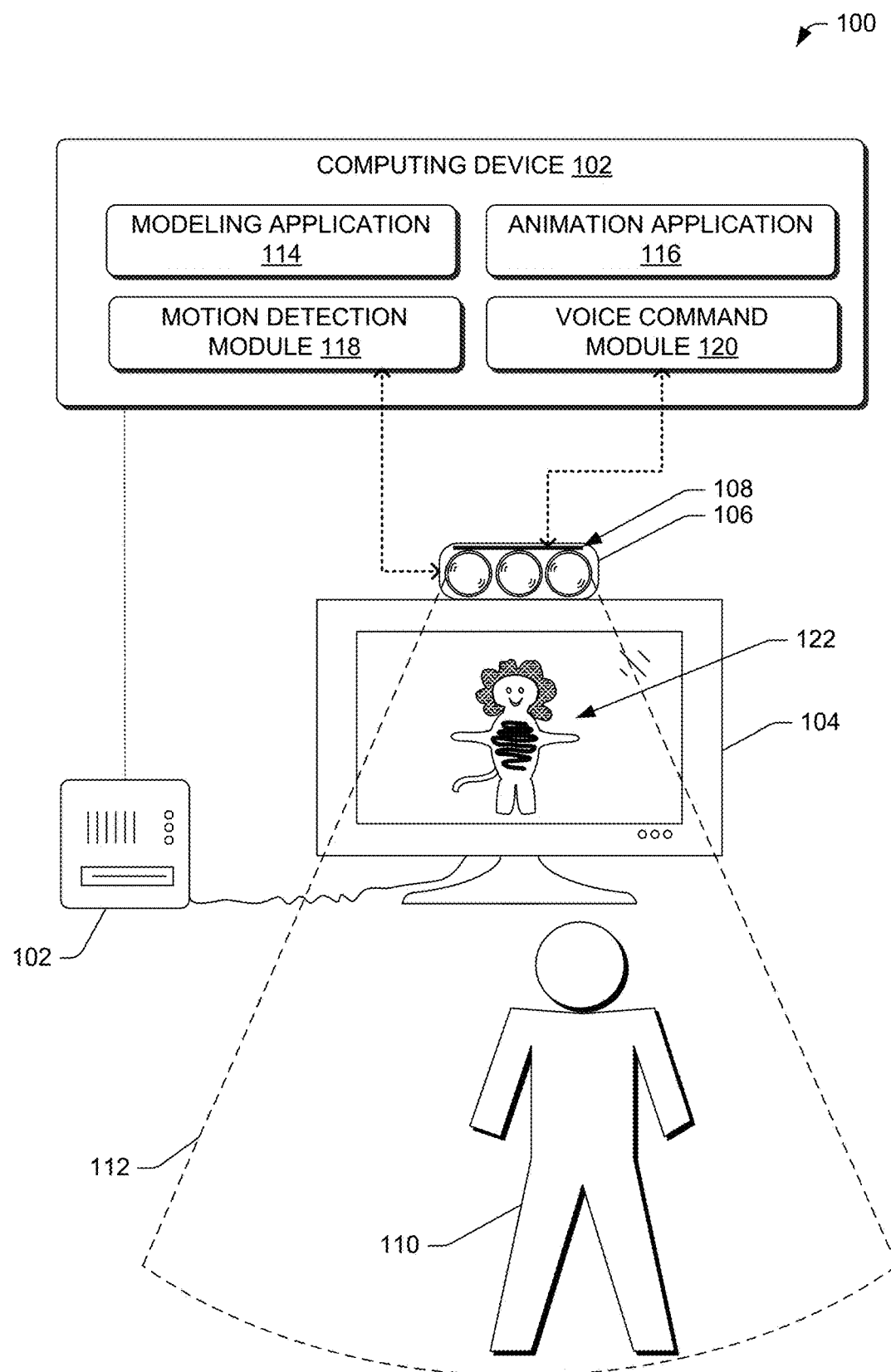
FIG. 1 is a schematic diagram of an illustrative environment that includes a computing architecture to model three dimensional (3D) objects using body gestures performed by a user.

FIG. 1 is a schematic diagram of an illustrative environment 100 that includes a computing architecture to model 3D objects using body gestures. The environment 100 includes a computing device 102 configured with a display 104. The computing device 102 may be a gaming console, a desktop computer, a laptop computer, a tablet, a smart phone, or any other type of computing device capable of receiving inputs from various devices (e.g., camera, microphones, etc.) and causing a visual display. The computing device 102 may be in communication with an imaging device 106 and a microphone 108. The microphone 108 is shown as being integrated with the imaging device 106, but may be implemented as a separate component. The microphone 108 may be implemented as a single microphone or as a microphone array that can detect a direction of some sounds. In some instances, the microphone 108 may be worn by a user 110 and may communicate with the computing device 102 using a wired or wireless connection. In some embodiments, the computing device 102, the display 104, the imaging device 106, and/or the microphone 108 may be integrated together.

In accordance with various embodiments, the computing device 102 may track movement of the user 110 within a zone 112 using the imaging device 106. In some embodiments, the imaging device 106 may include one or more cameras and one or more depth sensors, which may be used individually or together to record imagery in the zone 112, sense movement in the zone 112, determine relative distances of surfaces in the zone, detect colors, detect shapes (e.g., facial recognition, etc.), and/or perform other imagery functions. In some embodiments, the imaging device 106 may create a 3D interpretation of objects and people within the zone 112. The zone 112 may be within a room or other predefined range and angle from the imaging device 106.

The user 110, while being tracked by the imaging device 106, may communicate body gestures by movement of the user's appendages and body that, when received by the computing device and interpreted, may cause the computing device 102 to perform certain actions. For example, the body gestures may be interpreted by the computing device 102 to cause creation and editing of 3D object while the computing device is operating in a modeling mode. In some embodiments, the object may be an avatar that the user may then animate using body gestures, possibly while the computing device 102 is operating in an animation mode. In some instances, the computing device 102 may simultaneously operate in the modeling mode and the animation mode.

Body gestures may be any movements of the user 110 that are associated with commands that can be interpreted by the computing device 102. In some instances, the body gestures may be predefined by the computing device. However, the computing device 102 may also be capable of learning new body gestures, which may be assigned to events by the user 110. For example, when interacting with the computing device 102, a body gesture of jumping up and down may cause, after detection, the computing device 102 to execute a first operation while a body gesture of reaching out with a hand having a closed fist may cause, after detection, the computing device 102 to execute a second operation. Many different types of body gestures may be recognized by the computing device 102 by way of imagery captured by the imaging device 106. The body gestures may be performed by appendages of the user 110 (e.g., movement of a hand, foot, arm, fingers, etc.) and/or by the entire body movement of the user (e.g., jumping). In some embodiments, the gestures may be indicated by a cue, such as a signal to indicate that a gesture is to be performed and/or to indicate that the gesture has been completed. The cue may be a voice command, another gesture, a hardware input, and/or another type of input.

In addition to body gestures, the computing device 102 may receive voice commands from the user 110 by way of the microphone 108. The voice commands may be discrete words (e.g., "stop," "next," "menu," etc.), or may be commands parsed from natural language commands (e.g., "show me the menu," causing the computing device 102 to cause display of a menu, etc.).

The computing device 102, in a basic configuration, may include a modeling application 114, an animation application 116, a motion detection module 118, and a voice command module 120, each discussed in turn.

The modeling application 114 may receive input from the imaging device 106 to enable the user 110 to create a 3D model of an object using body gestures performed by the user 110. The modeling application 114 may create and edit objects formed using voxel modeling, implicit surface modeling, or other types of 3d modeling. The modeling application 114 may create a non-rigid animated object that can be animated by the user or by other inputs.

For example, the user 110 may use her body to create an initial object or shape, such as by forming a first pose with her body. The modeling application 114 may interpret the pose and form the initial object. The computing device 102 may cause display of the initial object on the display 104 to provide feedback to the user 110. The user 110 may then edit the initial object using the modeling application 114. The modeling application may recognize gestures, tools, voice commands, and/or other inputs, and in response perform operations to modify an object 122, such as the initial object. The modeling application 114 may repeatedly allow the user 110 to edit and modify the object 122. The modeling application 114 may interpret operations such as push a feature, pull a feature, sculpt a feature, sketch a feature, cut a feature, paint a feature, add a special feature, and/or other operations. These operations are discussed in greater detail below, and specifically with reference to FIGS. 5A and 5B. As shown in FIG. 1, the object 122, such as an avatar, may be presented back to the user 110 by the display 104.

The modeling application 114 may use body-centric coordinate mapping to map the user 110 to the object being modeled, and thus allowing the user 110 to interact with the object using body gestures. In some embodiments, the modeling application 114 may operate in a first person editing mode (body reference mode) or a third person editing mode (spatial mapping mode). The body reference mode may allow the user 110 to edit the object as if at least a part of the user 110 is the object. The spatial mapping mode may allow the user 110 to edit the object as if the user stepped out of the object and is next to the object. In the spatial mapping mode, the user 110 may freely move about relative to the object to edit the object from outside the object or edit the object from inside of the object. Thus, the modeling application 114 may determine a reference mode for operation (e.g., the spatial mapping mode or the body reference mapping mode), map locations of the user 110 to locations of the object or locations near the object, and then perform operations to the object based on the body gestures of the user 110. After the user confirms a mapping relation, the user may trigger an action. By triggering an action, whenever the user 110 touches the surface or a portion of the surface of the object with any part of her body, the object will transform accordingly. With body reference mapping, the modeling application 114 maps generally to the user's skeleton (e.g., use several joints along the line from the head to the foot, etc.) to a center line of the object (avatar). In this case, the user is able to touch some parts of her body to navigate to a certain part/point on the object or avatar. As discussed herein, the term "surface" may be used to mean an entire surface or a portion of a surface.

One main difference between these two mappings is in the spatial mapping mode, the user is free to move relative to the object, such as rotating and walking around the object or into the object as long as she does not trigger an editing action, such as by touching, with an editing tool, at least a portion of a surface mapped to at least a portion of a surface of the object. While in the body reference mapping mode, the object will follow the user's action so that the user will feel that she is the object herself. When she triggers an action, the modeling application 114 will stop the mappings for the editing hand/arm/leg, etc. For instance, when the user is using a right hand to edit the object (touch a surface of the object, etc.), the mapping relation between the right arm and the object may be at least temporarily ignored until the action is completed.

The animation application 116 may animate the object, such as an avatar. The animation application 116 may create relationships between the user's movement and the movement of the object. For example, when the object is an avatar that includes three arms, the animation application 116 may map two of the arms to respective arms of the user 110 and may map the movement of the third arm to one of the user's arms (e.g., left arm, etc.) or may not map the third arm to the user but instead control the third arm based on other information (e.g., random movement, aggregate movement of both the user's arm, etc.). The animation application 116 may enable the user to control the avatar (e.g., the object 122), such as during game play in an adventure game, a sports game, an action game, and/or in other games or scenarios.

The motion detection module 118 may capture and interpret movement of the user 110 that performs the body gestures. The motion detection module 118 may also capture 3D reference information, such as a pose of the user 110 that may be used to create the initial object. The motion detection module 118 may receive signals from the imaging device 106 and interpret those signals to enable creation of 3D objects, detection of body gestures, and so forth. Thus, the motion detection module 118 may interpret the movements and information from imagery captured by the imaging device 106, which may then be processed by the modeling application 114 and/or the animation application 116.

The voice command module 120 may capture and interpret sounds from the user 110 and/or other sounds. The voice command module 120 may interpret the sounds as voice commands, which may then be processed by the modeling application 114 and/or the animation application 116.

Illustrative Operation

Figure 2:
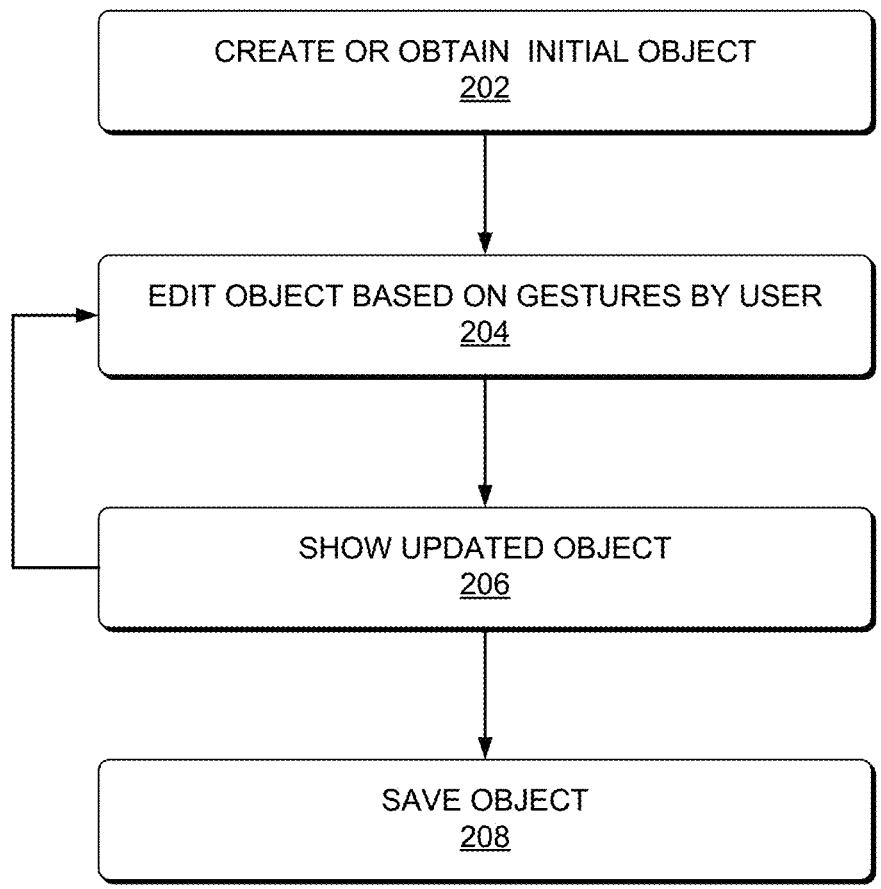
FIG. 2 is a flow diagram of an illustrative process of creating objects using body gestures.

FIG. 2 is a flow diagram of an illustrative process of creating objects using body gestures. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly. The process 200 is described with reference to the environment 100. However, the process 200 may be implemented in other environments.

At 202, the modeling application 114 may create or obtain an initial 3D object (or shape). For example the modeling application 114 may enable the user 110 to create the initial object by forming a pose and then creating a basic 3D model representative of the pose of the user. For example, if the user 110 where to kneel down and make her profile look generally like an egg, the initial object may be rendered in the basic shape of an egg. In some embodiments, the modeling application 114 may enable the user to select an existing object as the initial object. The existing object may be retrieved from a library of digital objects and/or captured from the real world by the imaging device 106 (e.g., scanning an object in front of the imaging device 106 to create a 3d object).

At 204, the modeling application 114 may edit the object 122 based on body gestures performed by the user 110. The modeling application 114 may, for example, interpret a body gesture as a "push a feature" operation, and in response, extrude an appendage from the initial object or from a modified form of the object 122.

At 206, the modeling application 114 may provide visual feedback to the user 110 to show changes to the object 122. The visual feedback may be presented via the display 104. The modeling application 114 may enable the user 110 to continually update the object 122 through repeated edits via the operation 204, which may be shown to the user 110 via the operation 206.

At 208, the modeling application 114 may save the object (e.g., an avatar). The modeling application 114 may enable use of the object 122 by other applications (e.g., games, resources, etc.), and/or may enable animation of the object, such as by use of the animation application 116.

Illustrative Computing Architecture

Figure 3:
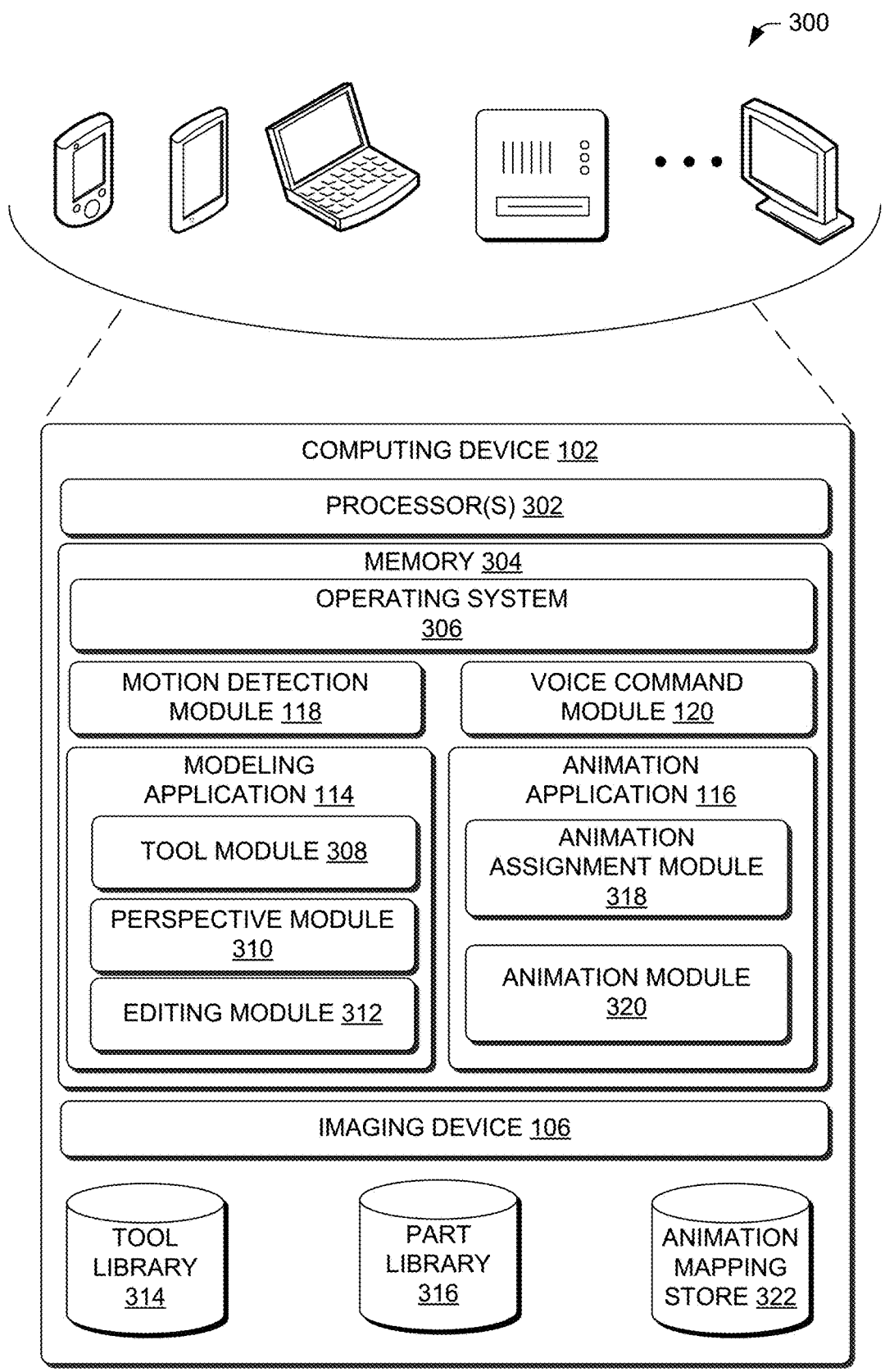
FIG. 3 is a schematic diagram of a computing architecture to enable creation and animation of avatars using body gestures.

FIG. 3 is a schematic diagram of a computing architecture 300 to enable creation and animation of avatars using body gestures. The computing architecture 300 shows additional details of the computing device 102, which may include additional modules, libraries, and/or hardware.

The computing architecture 300 may include processor(s) 302 and memory 304. The memory 304 may store various modules, applications, programs, or other data. The memory 304 may include instructions that, when executed by the processor(s) 302, cause the processor(s) to perform the operations described herein for the computing device 102.

The computing device 102 may have additional features and/or functionality. For example, the computing device 102 may also include additional data storage devices (removable and/or non-removable) such as, for example, magnetic disks, optical disks, or tape. Such additional storage may include removable storage and/or non-removable storage. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing device 102. Any such computer storage media may be part of the computing device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 304 may store an operating system 306 as well as the modeling application 114, the animation application 116, the motion detection module 118, and the voice command module 120.

The modeling application 114 may include various modules such as a tool module 308, a mapping module 310, and an editing module 312. Each of these modules is discussed in turn.

The tool module 308 may allow selection of tools for use by the user 110 to interact with the modeling application 114. The tools may be selected and identified based on object held by the user, by gestures of the user, by voice commands, or by a combination thereof. For example, the tool module 308 may detect a prop of a pair of scissors (e.g., plastic scissors, etc.) that are a real world object, held by the user 110, and detectable by the imaging device 106. The scissors may be associated with a type of action, such as an edit feature of cutting. As another example, the tool module 308 may receive a command "cut" or "use scissors" to initiate use of that particular tool. In yet another example, the user may use her fingers to make a scissor action with her index finger and middle finger moving apart and then back together, which may allow the tool module 308 to identify a desired use of that particular tool. Thus, the tool module 308 may enable identification and selection of tools based on at least gestures, voice commands, and/or real world objects. In some embodiments, the tools may also be selected from preexisting tools (e.g., from a menu.). The tool module 308 may store references and associated tools in a tool library 314. In some embodiments, the user 110 may define or modify definitions of the tools in the tool library 314.

In various embodiments, the modeling application 114 may detect tool and/or gestures based on a position of wearable devices, such as a glove. For example, the user may wear a glove, shirt, helmet, or other wearable devices which can be sensed by the imaging device 106. However, body gestures may be recognized without use of the wearable devices based on existing algorithms created for such purposes.

The mapping module 310 may cause the modeling application 114 to alternate between mappings. As discussed above, the modeling application 114 may operate in at least two mapping modes: a first person editing mode (body reference mapping mode) and a third person editing mode (spatial mapping mode). The body reference mapping mode may allow the user 110 to edit the object as if the user 110 was inside of the object or is the object. Thus, the object is mapped at least partially to the body of the user 110. The spatial mapping mode may allow the user 110 to edit the object as if the user stepped out of the object and is next to the object. Thus the object is mapped to a position that is different than, but accessibly by, the user 110. In this position, the user 110 may walk around the object as if the object is a statue being sculpted or otherwise edited by the user 110. The mapping module 310 may alternate between the modes based on body gestures of the user 110, voice commands, and/or other received selections. For example, the user gesture of "jumping to a side" may cause the mapping module to shift between the mappings. Other gesture commands may be used as well.

The mapping module 310 may manage reference planes and/or reference axes used by the modeling application to maintain mappings between the object and the user 110. In some embodiments, the user 110 may desire to adjust a mapping such as to rotate the object to enable editing a different side of the object. The mapping module may cause some actions to snap to or operate in certain ways with respect to the planes/axes, such as to snap to a plane or axis (e.g., sketching may snap to a plane and then be transformed to a 3D object after the sketch is completed). Thus, the mapping module 310 may create and manage reference information for the user 110 and the object, and may create and maintain a relationship between the reference information via the mappings, based partly on the mode of operation (the spatial mapping mode, the body reference mapping mode, etc.).

The editing module 312 may cause creation, selection, and edits to the object (e.g., the avatar). The edits may modify surfaces of the object. The edits may include operations such as push a feature, pull a feature, sculpt a feature, sketch a feature, cut a feature, paint a feature, add a special feature, and/or other operations. The edit module 312 may determine an operation to perform based on various information, such as a tool identified by the tool module 308, a mapping determined by the mapping module 310 (including corresponding mappings between the user 110 and the object), a location of the tool relative to the object (e.g., on surface of object, near the object), and so forth.

In some embodiments, the editing module 312 may enable the user 110 to obtain parts from a part library 316. For example, the user 110 may desire to add eyes, ears, and a mouth to her avatar. The eyes, ears, mouth, and other predetermined objects may be selectable from the part library. In some embodiments, the functionality of these parts may be accessible and/or assignable. For example, the user 110 may create an eye using the editing module, and then assign the function of the created eye as the function of seeing, which in turn may modify a display during animation of the avatar (e.g., during game play, etc.). Other common parts or user created parts may be stored in the part library and made accessible to the editing module 312. In some embodiments, the part library 316 may be accessible to other computing devices via a network connection.

In various embodiments, the edit module 312 may provide feedback to the user 110, via an output to the display of the avatar, to assist in editing the avatar. For example, the edit module 312 may identify a selectable portion of the object (e.g., a portion of a surface of the object, etc.) about to be edited before the editing occurs, may indicate a currently selected tool, indicate one or more reference planes and/or axes, and so forth. The user 110 may then use this information prior to or during the editing of the avatar.

In accordance with one or more embodiments, the modeling application 114 may enable multi-user operations, such as by enabling two or more users to design an object while working together. For example, a first user may act as the object while a second user performs edit operations on the object (positioned as the first user).

The animation application 116 may include various modules such as an animation assignment module 318 and an animation module 320. Each of these modules is discussed in turn.

The animation assignment module 318 may map motion and animation features of the avatar (created via the modeling application 114) to body gestures of the user 110. In some embodiments, the animation assignment module 318 may map motion and animation features to related parts (e.g., map left arm of avatar to left hand of the user 110). However, when the avatar includes features that do not correspond to features of the user 110, then customized assignments may be performed by the animation assignment module 318. In various embodiments, the animation assignment module 318 may allow the user 110 to specific mappings and animation of these non-corresponding features. For example, when the avatar includes three arms, the animation application 116 may map two of the arms to respective arms of the user 110 and may map the movement of the third arm to one of the user's arms (e.g., left arm, etc.) or may not map the third arm to the user but instead control the third arm based on other information (e.g., random movement, aggregate movement of both the user's arm, movement of a leg, etc.). As another example, when the avatar does not include legs, the animation assignment module 318 may map a gesture such as jumping with movement of the avatar. The animation assignment module 318 may use a structured process to enable the user to specify mappings of motion to features of the avatar, which may be stored in an animation mapping store 322. In some embodiments, the animation mapping store 322 may include selectable animations, such as movement of a tail, which can be assigned to a feature of a tail included on the avatar and so forth.

The animation module 320 may cause animation of the avatar by implementing the animation assignments created by the animation assignment module 318 and stored in the animation mapping store 322. In some embodiments, the animation application 116 may be used by other resources, such as other games, applications, and so forth.

Illustrative Operations

Figure 4:
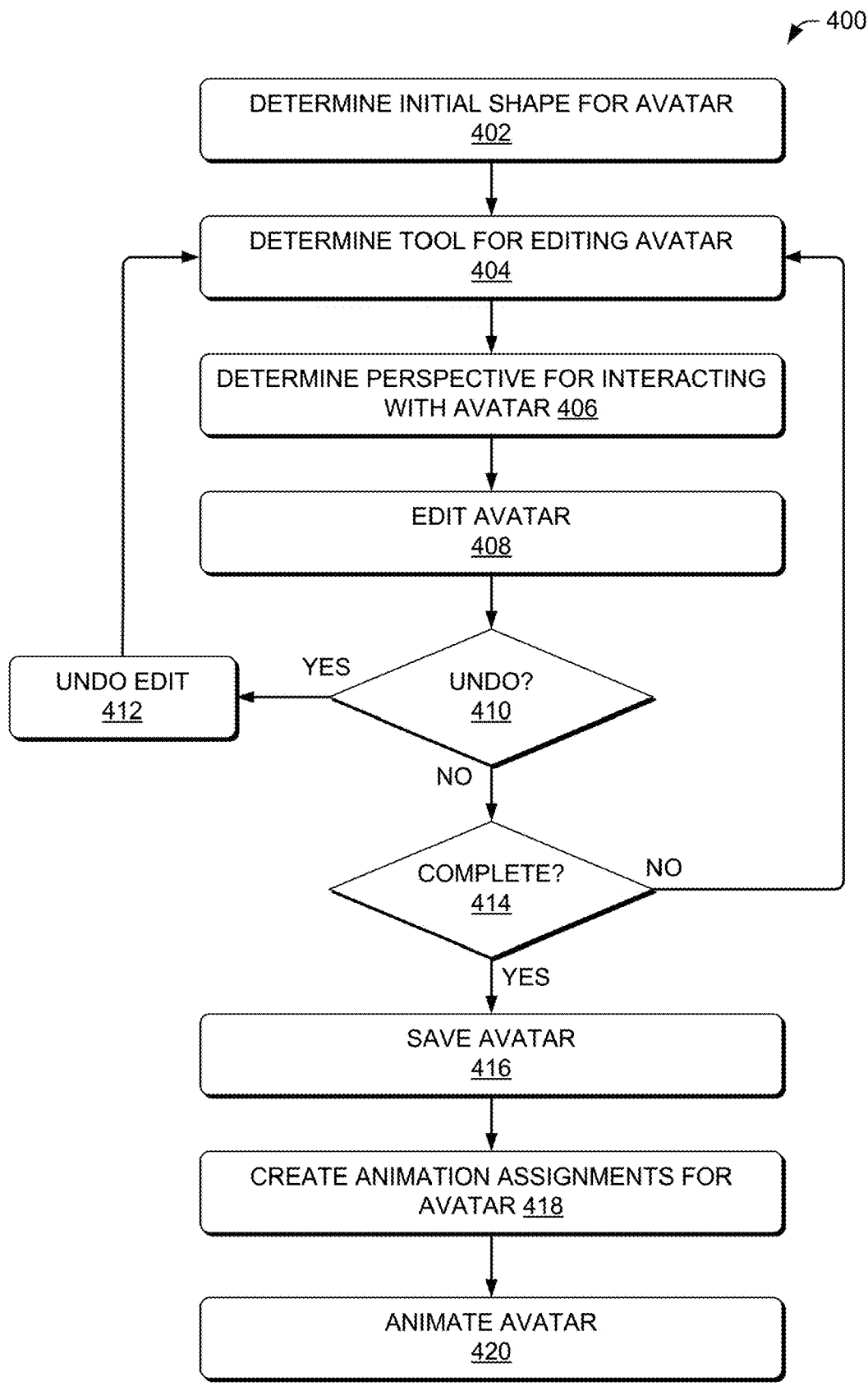
FIG. 4 is a flow diagram of an illustrative process of creating and animating an avatar using body gestures.

FIG. 4 is a flow diagram of an illustrative process 400 of creating and animating an avatar using body gestures. Similar to the process 200, the process 400 is illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the process. The process 400 is described with reference to the environment 100 and the computing architecture 300. However, the process 400 may be implemented in other environments and/or other computing architectures.

At 402, the modeling application 114 may determine an initial shape for the avatar. For example the modeling application 114 may enable the user 110 to create the initial object by forming a pose and then creating a basic 3D model representative of the pose of the user. In some embodiments, the modeling application 114 may enable the user to select an existing object as the initial shape. For example, the user 110 may create the initial shape using a toy or other real or virtual object.

At 404, the tool module 308 may determine a tool for use by the user 110. The tool module 308 may determine the tool based on a user selection, which may be a voice command, a body gesture, a menu selection, or another type of selection. For example, the tool module 308 may determine the tool based on a prop that is picked up by the user (e.g., a pair of scissors, a wand, etc.).

At 406, the mapping module 310 may determine a mapping for interaction between the user 110 and the avatar. For example, the mapping module 310 may determine the mapping from a voice command, a gesture, a menu selection, or another type of selection.

At 408, the editing module 312 may cause an edit to the avatar. The edit may change the 3D shape of the initial shape or an edited shape (after one or more edits to the initial shape). The edits may include operations such as push a feature, pull a feature, sculpt a feature, sketch a feature, cut a feature, paint a feature, add a special feature, and/or other operations.

At 410, the modeling application 114 may determine whether to undo an edit. For example, the user 110 may make create a feature using a gesture and then decide she does not like the newly created feature or that the newly created feature was not created as intended. Thus, the decision operation 410 may enable quick and easy reversion to a version of the avatar prior to a most recent edit. In some embodiments, the decision operation 410 may allow the user 110 to undo any number of edits (features). When the decision operation 410 determines to undo one or more edits (following the "yes" route from the decision operation 410), then the process 400 may advance to an operation 412.

At 412, the one or more edits may be removed, thus reverting back to a prior version of the avatar prior to implementation of one or more edits by the operation 408. Following the operation 408, the process 400 may return to the operation 404, the operation 406, and/or the operation 408 to allow the user to continue to edit the avatar, or possibly to a save operation 416.

When the decision operation 410 determines not to undo one or more edits (following the "no" route from the decision operation 410), then the process 400 may advance to an operation 414. This route may not require action by the user 110 (e.g. may be a default route). At 414, the modeling application 114 may determine whether the avatar is completed (typically base on a user selection). When the avatar is not complete (following the "no" route from the decision operation 414), then the process 400 may advance to the operation 404, the operation 406, and/or the operation 408 to continue modifying the avatar.

When the avatar is complete (following the "no" route from the decision operation 414), then the process 400 may advance to an operation 416. At 416, the modeling application 114 may save the avatar. In some embodiments, the avatar may be saved at other times, such as by automatic saving performed by the modeling application 114.

At 418, the animation assignment module 318 may allow the user to map motion and animation features of the avatar (created via the modeling application 114) to body gestures of the user 110. The mapped animation relationships may be stored in the animation mapping store 322.

At 420, the animation module 320 may cause animation of the avatar based on user gestures in accordance with the mappings stored in the animation mapping store 322. In some embodiments, the process 400 may enable later modifications and/or edits to the avatar after the operations 416, 418, and/or 420 by allowing the process 400 to return to the operation 404 or other operations shown in FIG. 4.

Figure 5A:
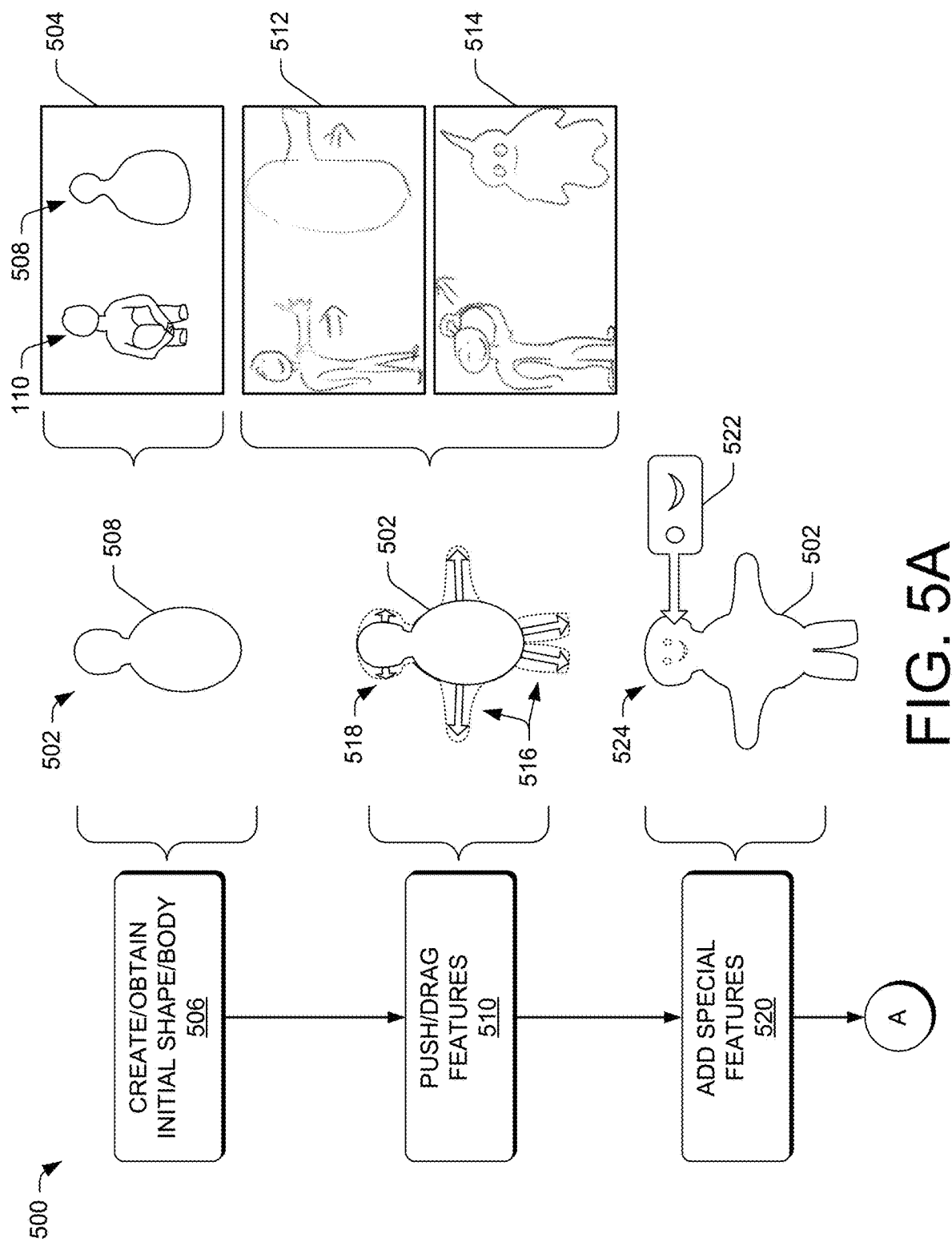
FIGS. 5A and 5B are pictorial flow diagrams of an illustrative process of creating and editing an avatar using body gestures.
Figure 5B:
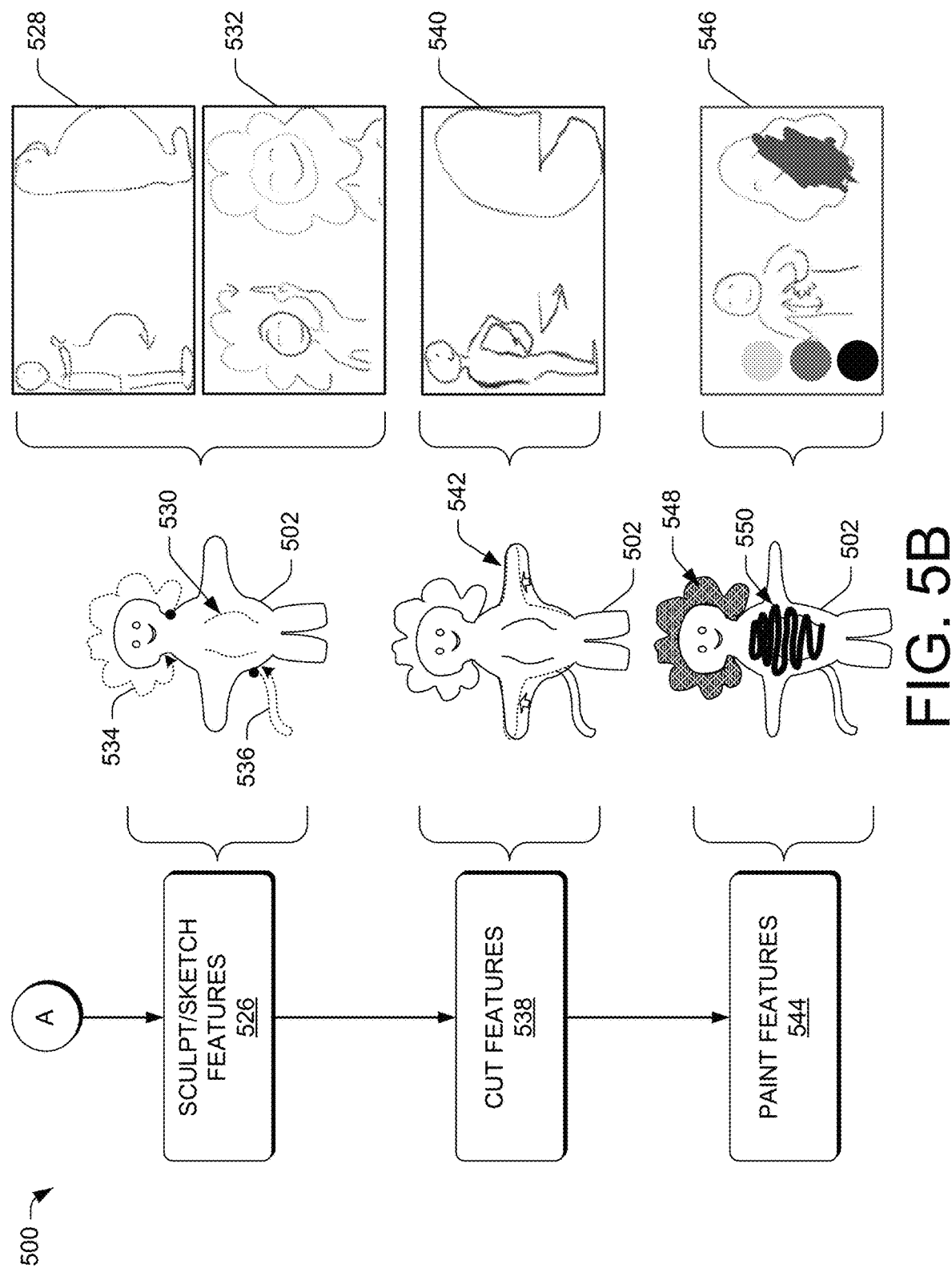

FIGS. 5A and 5B are pictorial flow diagrams of an illustrative process 500 of creating and editing an avatar using body gestures. Similar to the process 200 and the process 400, the process 500 is illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the process. The process 500 is described with reference to the environment 100 and the computing architecture 300. However, the process 500 may be implemented in other environments and/or other computing architectures.

The process 500 shows a series of edit functions arranged as operations that perform edits to an example object (avatar). The order of the operations is purely illustrative and may occur in any order. In some instances, the same edit operation may be performed many times while other edit operations may not be used to create an object. The process 500 shows creation of an avatar; however, the process 500 may be used to create other objects using body gestures made by the user 110.

Each operation shown in the process includes an associated representation of an avatar 502. Some operations include a user action frame (e.g., a user action frame 504) to show how one or more features in the operation may be created based on body gestures of the user 110. The user action frame shows an action of the user on the left side of the frame and corresponding example change to the object on the right side of the frame. The user action frames are illustrative of some possible results of body gestures performed by the user 110.

At 506, the edit module 308 may create or obtain an initial body 508 for the avatar 502. The user action frame 504 shows the user 110 posing in a position to create the body 508 of the avatar 502. However, the edit module 308 may create the body 508 using existing real world objects or vertical objects.

At 510, the edit module 308 may create push features or drag features based on respective body gestures performed by the user 110 and sensed by the motion detection module 118. A push operation may occur when the body gesture pushes against a surface (or portion of a surface) of the avatar 502, as shown in a user action frame 512. A drag (or pull) operation may occur when the body gesture pulls a surface of the avatar 502, as shown in a user action frame 514. The push and pull operations may create extrusions such as appendages 516 (e.g., arms, legs, etc.). The push and pull operations may also modify a size or shape of existing features, such as modifying a shape of a head 518 of the avatar 502 by widening the head (or possibly by shrinking the head, etc.). The push and pull operations may be performed in the first person editing mode (body reference mapping mode) and/or the third person editing mode (spatial mapping mode). In the body reference mapping mode, the edit module may determine that the user's gesture is a push against a surface of the avatar 502 outwards as if the user 110 was inside of the avatar. In the spatial mapping mode, the edit module 308 may determine that the user's gesture is pull from a surface of the avatar 502 outwards as if the user 110 were outside of the avatar and pulling a part of the avatar. The push/pull operation may start and stop following cues. A start cue may be an identification of a tool touching a surface of the avatar. The extrusion may stop after the use performs a gesture to stop the push or pull operation (e.g., releases clamped hand, pauses for a predetermined amount of time, etc.).

At 520, the edit module 308 may add special features 522 to the avatar 502. The special features 522 may be obtained from the parts library 316. For example the user may add special features of eyes and a mouth 524 to the avatar. The special features 522 may be added to the avatar using any mapping mode. In some embodiments, the special features 522 may be added by selecting the special feature (via gestures, voice commands, and/or menu selections) and then touching a location on the avatar to place the special features. In some instances, the special features may include assignment of functionality, such as an ability to hear, to see, and so forth. These sensory attributes may be added to existing features using the editing module 308 in some embodiments. Thus, the editing module 308 may assign sensory attributes and/or parts to specific locations on the avatar based on body gestures performed by the user 110.

Moving to FIG. 5B, at 524, the edit module 308 may create sculpt features or sketch features based on respective body gestures performed by the user 110 and sensed by the motion detection module 118. A sculpt operation may occur when the body gesture moves over a surface to define a new profile or location for an adjacent surface. A user action frame 528 shows an example sculpt operation to create a paunch for an avatar. An example sculpted feature 530 is shown on the avatar 502.

A sketch operation may occur when the body gesture draws an outline on a surface or plane (e.g., a reference plane provided by the mapping module 310). A user action frame 532 shows an example sketch operation to create hair 534 (or a mane) for the avatar 502. In another example, the edit module 208 may be used to sketch a tail 536. The tail may also be created by other edit operations, such as the drag operation. Thus, some features may be created using one or more different edit operations.

When implementing the sketch operation, the edit module 308 may first place the sketch on a plane or other surface, and then associate or connect the sketch to the avatar 502. The edit module 308 may transform the sketch to a 3D sketch by adding volume to a resultant feature, such as volume to the tail 536 or the hair 534. The sculpt operation and the sketch operation may be performed in the first person editing mode (the body reference mapping mode) and/or the third person editing mode (spatial mapping mode).

At 538, the edit module 308 may cut features based on respective body gestures performed by the user 110 and sensed by the motion detection module 118. A cut operation may occur when the body gesture moves into a surface of the avatar 502, such as shown in a user action frame 540. The cut operation may be used to reduce a size, shape, or volume of an existing feature. For example, the gestures by a user may motion to cut the size of the arms 542 of the avatar to make the arms narrower. In some embodiments, the cut operation may be performed using a same or similar algorithm as the push/pull operations, but may reduce the size of a feature rather than increase a size of a feature. The cut operation may be performed in the first person editing mode (body reference mapping mode) and/or the third person editing mode (spatial mapping mode).

At 544, the edit module 308 may paint colors, textures, patterns, clothing, and/or other features on the avatar. The paint operation may be performed by selecting a paint attribute (e.g., colors, textures, patterns, clothing, etc.), and then applying the paint attribute to a surface using a body gesture, such as shown in a user action frame 546. For example, the user 110 may add color, texture, etc. to the hair 548 and or add color, texture, clothing, markings, etc. to a body 550 of the avatar. In some embodiments, the paint feature may enable selection of colors, textures, or other paint attributes from attributes of existing object (real objects and/or virtual objects).

Illustrative Operations

Figure 6:
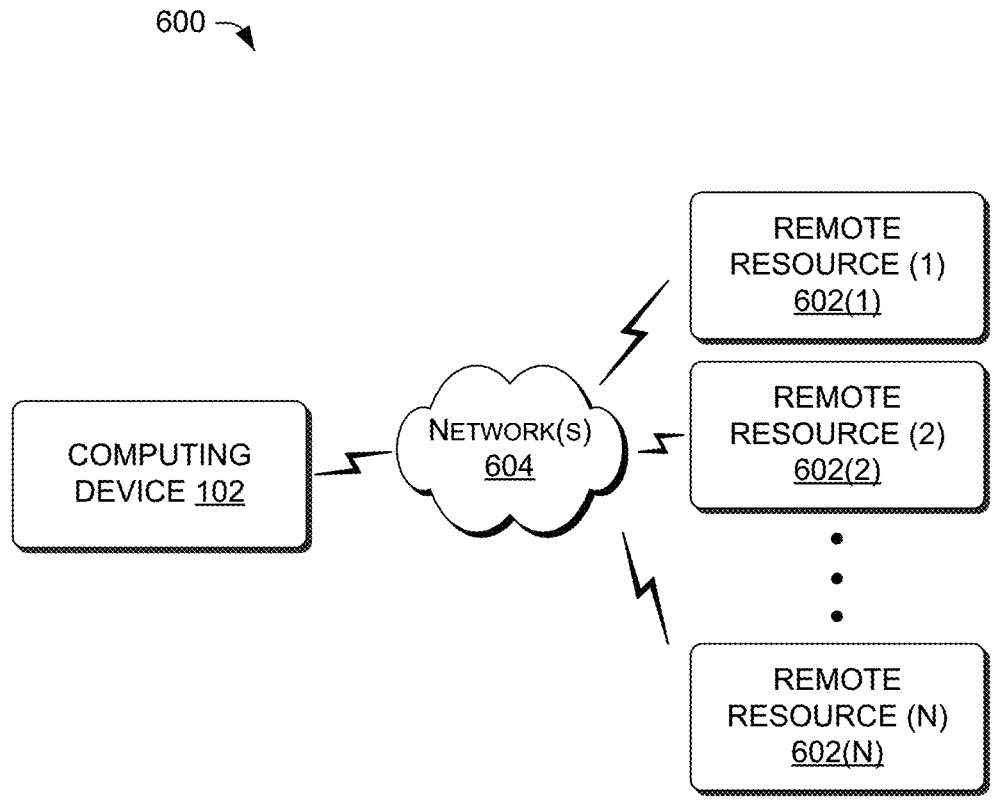
FIG. 6 is a schematic diagram of an illustrative environment where the computing device includes network connectivity.

FIG. 6 is a schematic diagram of an illustrative environment 600 where the computing device 102 includes network connectivity. The environment 600 may include communication between the computing device 102 and one or more remote resources, such as remote resources 602(1), 602(2), . . . , 602(N) through one or more networks 604. The networks may include wired or wireless networks, such as Wi-Fi networks, mobile telephone networks, and so forth.

The remote resources 602(1)-(N) may host some of the functions shown in the computing architecture 300. For example, the remote resources 602(1)-(N) may store the avatar for access in other computing environments, may perform the animation processes or portions thereof, may perform the modeling processes or portions thereof, and so forth. The remote resources 602(1)-(N) may be representative of a distributed computing environment, such as a cloud services computing environment.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
creating, using one or more depth sensors, a three dimensional (3D) object of a user;
mapping between the user and the 3D object, wherein the user is mapped to a similar location as the 3D object to allow the user to interact with the 3D object in a first-person editing perspective, and at least a part of the user is inside of the 3D object;
causing presentation of the 3D object to the user;
editing the 3D object by:
determining an edit operation to be performed on the 3D object, wherein the edit operation includes at least one of a push operation, a drag operation, a sketch operation, a cut operation, or a paint operation; and
performing the edit operation on the 3D object based at least in part on a gesture of the user that is sensed by the one or more depth sensors; and
animating the 3D object based on the gesture of the user.

2. The method as recited in claim 1, further comprising:
determining a second edit operation to be performed on the 3D object;
performing the second edit operation on the 3D object based at least in part on a second gesture of the user that is sensed by the one or more depth sensors; and
animating the 3D object based on the second gesture of the user.

3. The method as recited in claim 2, wherein the performing the second edit operation includes:
selecting at least a portion of a surface of the 3D object based on a first part of the second gesture of the user; and
modifying the at least a portion of the surface of the 3D object based on a second part of the second gesture of the user.

4. The method as recited in claim 3, further comprising:
receiving a selection of an existing 3D object, and adding the existing 3D object to the 3D object.

5. The method as recited in claim 4, further comprising obtaining the existing 3D object by scanning a real world object using the one or more depth sensors.

6. The method as recited in claim 2, wherein the determining the second edit operation includes identifying a tool based on object recognition or based on the second gesture.

7. The method as recited in claim 1, further comprising determining the mapping prior to performing the edit operation.

8. The method as recited in claim 1, wherein the 3D object is an avatar.

9. The method as recited in claim 1, further comprising:
mapping features of the 3D object to body parts of the user sensed by the one or more depth sensors, and wherein the animating the 3D object includes moving the features of the 3D object based on movement of the body parts of the user.

10. The method as recited in claim 1, further comprising: storing the 3D object for access by another computing device.

11. The method as recited in claim 1, further comprising:
receiving a voice command using a microphone,
wherein the determining the edit operation or the performing the edit operation is based at least partly on the voice command.

12. The method as recited in claim 1, wherein the gesture of the user pushes against an outline on a surface of the 3D object based the at least the part of the user being inside of the 3D object, and the animating of the 3D object modifies a shape of a head of the 3D object based on the gesture.

13. A system comprising:
one or more depth sensors to detect gestures of a user;
one or more processors; and
memory to store computer readable instructions that, when executed on the one or more processors, cause the one or more processors to perform acts comprising:
creating, using the one or more depth sensors, a three dimensional (3D) object of a user;
mapping between the user and the 3D object, wherein the user is mapped to a similar location as the 3D object to allow the user to interact with the 3D object in a first-person editing perspective, and at least a part of the user is inside of the 3D object;
causing presentation of the 3D object to the user;
editing the 3D object by:
determining an edit operation to be performed on the 3D object, wherein the edit operation includes at least one of a push operation, a drag operation, a sketch operation, a cut operation, or a paint operation; and
performing the edit operation on the 3D object based at least in part on a gesture of the user that is sensed by the one or more depth sensors; and
animating the 3D object based on the gesture of the user.

14. The system as recited in claim 13, wherein the computer readable instructions that, when executed on the one or more processors, cause the one or more processors to perform acts further comprising:
determining a second edit operation to be performed on the 3D object;
performing the second edit operation on the 3D object based at least in part on a second gesture of the user that is sensed by the one or more depth sensors; and
animating the 3D object based on the second gesture of the user.

15. The system as recited in claim 13, wherein the edit operation modifies a location of at least a portion of a surface of the 3D object based on movement of the user during the gesture.

16. The system as recited in claim 13, wherein the determining the edit operation is based at least in part on identification of a tool held by the user and detected by the one or more depth sensors.

17. The system as recited in claim 13, wherein the computer readable instructions that, when executed on the one or more processors, cause the one or more processors to perform acts further comprising:

creating the 3D object using at least one of voxel modeling or implicit surface modeling.

18. The system as recited in claim 13, wherein the 3D object is an avatar.

19. One or more memory storing computer-executable instructions that, when executed on one or more processors, causes the one or more processors to perform acts comprising:

creating, using one or more depth sensors, a three dimensional (3D) object of a user;

mapping between the user and the 3D object, wherein the user is mapped to a similar location as the 3D object to allow the user to interact with the 3D object in a first-person editing perspective, and at least a part of the user is inside of the 3D object;

causing presentation of the 3D object to the user;

editing the 3D object by:

determining an edit operation to be performed on the 3D object, wherein the edit operation includes at least one of a push operation, a drag operation, a sketch operation, a cut operation, or a paint operation; and performing the edit operation on the 3D object based at least in part on a gesture of the user that is sensed by the one or more depth sensors; and animating the 3D object based on the gesture of the user.

20. The one or more memory as recited in claim 19, further comprising:

determining a second edit operation to be performed on the 3D object;

performing the second edit operation on the 3D object based at least in part on a second gesture of the user that is sensed by the one or more depth sensors; and animating the 3D object based on the second gesture of the user.

* * * * *